United States Patent Office 3,184,834
Patented May 25, 1965

3,184,834
SELECTED Mo-Nb-Si-Ti COMPOSITIONS AND OBJECTS THEREOF
Max F. Bechtold, Kennett Square, Pa., assignor to E. I. du Pont de Nemours and Company, Wilmington, Del., a corporation of Delaware
No Drawing. Filed Dec. 19, 1961, Ser. No. 160,645
7 Claims. (Cl. 29—182)

This invention relates to novel compositions of matter containing moybdenum, niobium, silicon and titanium; to articles of manufacture (i.e., shaped objects) prepared therefrom which are hard, strong, creep-resistant and resistant to oxidation even at high temperatures; and to methods for preparing such articles.

This application is a continuation-in-part of application S.N. 3,994, filed January 22, 1960, now abandoned.

Much effort has been expended in search of materials that are resistant to degradation at elevated temperatures. Although many silicides, such as molybdenum disilicide, possess good oxidation resistance at high temperature, these silicides are extremely brittle, creep rapidly under load at 1400–1500° C. and are therefore unsuitable for use as structural materials. Modified molybdenum-silicon compositions have been described, for example, in Austrian Patent No. 181,431, which refers to molybdenum-silicon compositions containing up to 45% of one or more of the high melting transition metals of the 4th, 5th and 6th groups of the Periodic System, such as titanium, zirconium, vanadium, niobium, and tungsten. These transition metals may be completely or partially replaced by their compounds such as nitrides, borides, silicides and oxides. However, in this very general description of molybdenum-silicon compositions with elements comprising a substantial fraction of the Periodic Table, no molybdenum-niobium-silicon-titanium composition is described nor are any materials primarily useful in structural applications disclosed. Nowotny et al. [Plansee Proceeding, edited by F. Benesovsky, Pergamon Press, London (1956)] have reported structural relationships for a number of pseudo-ternary disilicide systems based on X-ray analyses. However, no systems containing niobium silicides are described nor is any mention made of the physical properties of any silicide or of its use in structural applications.

It is an object of this invention to provide novel compositions of matter containing molybdenum, niobium, silicon and titanium, including untreated, fired, hot-pressed and melt-cast compositions of these elements. Another object of the invention is to provide articles or shaped objects prepared either by firing, hot-pressing or melt-casting shaped but otherwise untreated compositions (hereinafter sometimes referred to as precursor compositions), or by machining or otherwise shaping previously fired, hot-pressed or melt-cast compositions. A still further object is to provide novel methods for preparing the aforesaid fired, hot-pressed or melt-cast compositions and articles. Thus, the overall object of the invention is to furnish structural materials containing molybdenum, niobium, silicon and titanium in certain proportions which endow such structural materials with heretofore unobtainable combinations of properties.

Such structural materials are readily prepared from an untreated or precursor composition of matter in which molybdenum, niobium, silicon and titanium are present (on the basis of elemental analysis) in the proportions (by weight) of 8–65% Mo, 2–30% Nb, 15–45% Si, and 10–65% Ti.

The fired, hot-pressed and melt-cast compositions and objects of the invention (hereinafter sometimes referred to as converted compositions and objects) are those containing molybdenum, niobium, silicon and titanium in the proportions (by weight) of 8–65% Mo, 2–30% Nb, 15–45% Si, and 10–65% Ti. Element(s) or compound(s) in addition to molybdenum, niobium, silicon and titanium may be present in the converted compositions and objects, and thus in the precursor compositions, provided they do not have a substantial adverse effect upon one or more of the properties: excellent impact strength as well as good oxidation resistance, good creep resistance, good transverse rupture strength and high hardness at elevated temperatures, or upon the inherent properties of the Mo-Nb-Si-Ti system (i.e., the system consisting of these four elements present in the above proportions), at whatever temperature the converted compositions and objects are to be utilized. Various impurities, i.e., elements other than molybdenum, niobium, silicon and titanium which are present in minor amounts in the commercially available starting materials can be tolerated, as can added amounts of other element(s) and compound(s) which will not affect one or more of the desired properties, to a degree sufficient to make the fired or melt-cast compositions undesirable as structural materials. There may be added such amounts of element(s) and/or compound(s) which will impart to the compositions, in an anticipated manner, various properties that are desirable for special applications without substantially affecting their inherent attributes as structural materials for the particular application in question.

It is to be understood that minor changes in the relative proportions of the essential elements will occur when the untreated compositions are converted to fired or melt-cast compositions or objects due to the elimination of expendable impurities in the starting materials and to the loss of inconsequential amounts of $MoO_3$. However, for simplicity of expression and ease of understanding, the proportions of essential elements in the precursor compositions and in the converted compositions and objects are hereafter referred to in terms of the same numerical values.

The converted composition and objects of this invention are prepared by pressing a Mo-Nb-Si-Ti composition having the desired elemental analysis into the appropriate form and then heating to a temperature of at least 900° C. (firing), by hot-pressing at a temperature of at least 900° C. under a pressure of at least 1000 lb./sq. in., or by using conventional melting and casting techniques at a temperature above about 2000° C.

Although, as indicated above, all converted objects within the broad composition ranges of this invention possess desirable and useful properties, it will be appreciated that certain compositions are superior to others with respect to particular properties and therefore are preferred in applications requiring these properties in high degree. For example, increasing the silicon content improves oxidation resistance of the product, whereas decreasing the silicon content generally results in the preparation of converted products which have higher transverse rupture strengths at elevated temperatures, but which retain superior oxidation resistance. Also, transverse rupture strength and oxidation resistance are influenced by the titanium content of the converted object. For high transverse rupture strength, the higher titanium contents are preferred, although high temperature oxidation resistance is less in such compositions. For high impact strength, compositions which contain small proportions of an alkaline material, as described in greater detail below, are generally preferred. Converted compositions containing high molybdenum contents exhibit better dimensional stability than compositions containing a lower percentage of molybdenum. However, such compositions generally have decreased scale resistance. Increasing the niobium content results in easier fabrication of stress and crack-free compositions and objects.

As is apparent from the preceding paragraph, the best composition for a particular application will vary depending on the requisite mechanical properties at the temperature involved. However, converted compositions and shaped objects of the invention are particularly well suited for prolonged use in applications where they are subjected to temperatures above 1000° C. Thus, preferred converted products of the invention may be described as fired, hot-pressed, and melt-cast compositions and objects, which contain molybdenum, niobium, silicon and titanium in the proportions referred to above and which have excellent impact strength and oxidation resistance as well as good creep resistance, high hardness, and good transverse rupture strength at temperatures above 1000° C., i.e., converted compositions and objects which are not adulterated with impurities having a consequential adverse effect upon such properties at a temperature above 1000° C.

Specific examples of compositions containing 8–65% Mo, 2–30% Nb, 15–45% Si and 10–65% Ti and which are particularly outstanding with respect to one or more specific high temperature properties are as follows: Compositions containing about 16.5% Mo, 15.9% Nb, 35.6% Si, and 31.2% Ti exhibit superior dimensional stability and are particularly suitable for uses involving exposure to oxidizing conditions at high temperature. When outstanding high temperature strength properties are desired in combination with high stability in air, compositions containing 15–50% Mo, 2–25% Nb, 20–40% Si and 15–40% Ti are preferred. Objects prepared from such molybdenum-niobium-silicon-titanium compositions possess high impact strength coupled with excellent oxidation-resistance and high tensile strength at elevated temperature. By virtue of these properties, they are useful in cutting tools and in structural elements used at high temperatures such as turbine buckets and other parts of propulsion engines.

Converted compositions which have been examined by X-ray and metallographic techniques are composed of one or more phases. However, the precise phase content of all converted objects or compositions within the above-defined composition ranges is not known. Of particular interest are four phases which have been determined by X-ray analysis to constitute two new classes of chemical compounds. These new classes of chemical compounds are quaternary silicides of the respective formulae, $$(Nb_xTi_yMo_{1-x-y})Si_2$$

and $(Nb_{x'}Ti_{y'}Mo_{1-x'-y'})_5Si_3$. Both the formula for the disilicide and the formula for the 5/3 silicide are generic to two crystal phases one being tetragonal and the other being hexagonal. In any event, the two types of crystal structure encompassed by each formula contain molybdenum, niobium, silicon and titanium in the relationship defined by the respective formulas. The above new classes of disilicides and 5/3 silicides are also included within the scope of this invention.

In preparing the compositions of this invention, the elements themselves or compounds and alloys thereof can be employed. For example, the compositions can be prepared by heating together molybdenum, niobium, silicon, and titanium in such proportions that the final composition falls within the ranges cited above. Alternatively, all or part of the molybdenum may be introduced in the form of a molybdenum-silicon alloy. It is also possible to employ titanium disilicide, silico-titanium alloys, and niobium-silicon alloys.

When fabrication is to be carried out by pressing and heating, or by hot-pressing, the untreated composition is preferably in the form of a fine powder having substantially all particles less than 75 microns in size, and which should be thoroughly mixed to insure homogeneity. Particularly useful compositions are obtained by grinding together molybdenum, niobium, titanium disilicide and silicon or titanium in such proportions that the resulting powder falls within the ranges of composition and particle size mentioned above.

The above compositions are readily shaped, for example, by cold-pressing or by slip-casting techniques, and then converted by firing at a temperature of at least 900° C., preferably 1300–1850° C. or above. Such objects are also obtained by hot-pressing at a pressure of at least 1000 p.s.i. and a temperature of 900° C. or above. It is preferred that hot-pressing be carried out at 1300–1700° C. under 2000–5000 p.s.i. pressure.

When converted objects are prepared by melt-casting, the particle size of the constituent materials is not critical and relatively massive forms such as lumps can be employed. A temperature sufficient to bring the entire charge to a molten condition must, of course, be employed. Generally, this temperature will be above about 2000° C. and preferably will be in the range of about 2200–2500° C.

Whatever the method of conversion, the time of heating must be sufficient to insure complete conversion. Times of 30 seconds to 30 minutes usually suffice although longer periods may be employed if desired without detrimental effect. When firing techniques are employed, it is sometimes desirable to carry out a preliminary firing of the precursor powder composition under the conditions described above, and then to grind the fired material to fine particle size and again fire in the form of the final object. This procedure results in objects having superior high temperature properties.

Powder compositions may be converted by compressing and firing in the dry state. However, it is often helpful to moisten the powder with a liquid, e.g., water, to assist in forming it into the desired shape. Dilute alkaline solutions are particularly desirable for this purpose because the small amount of alkaline material remaining in the composition after drying leads to the formation of converted objects having much improved properties as described in greater detail below. Before heat treatment, any water or other volatile liquid present in the compacted powder should be reduced to less than about 3% (by weight of the powder) to prevent rupture of the object during firing. Preferably, the volatile liquid is one that will be completely vaporized at a temperature less than about 350° C., e.g., water, alcohol or kerosene.

Depending on the properties desired in the converted product, it is sometimes preferred to incorporate a small amount of alkali metal or alkaline earth metal in the untreated composition before it is converted by heat treatment. This procedure is particularly beneficial when fired or hot-pressed compositions and objects having higher impact strengths and improved oxidation resistance are desired. Thus, by incorporating an alkali or alkaline earth metal in the composition before conversion, a significant and unexpected change in properties is obtained, and this change assumes considerable importance for special high temperature applications where excellent impact strength is the objective. This process and the converted compositions and objects produced thereby constitute preferred embodiments of the invention.

The manner in which the alkaline earth metal or alkali metal is introduced into the composition is not critical. Thus, these metal(s) may be introduced in the dry state either as elements or compounds, or in liquid form as dispersions or solutions. When compounds are used, the alkali or alkaline earth metal is preferably introduced as a compound of one of the elements of the composition, e.g., sodium or lithium molybdate, or a compound which will thermally decompose at conversion temperature leaving an oxide or hydroxide residue, e.g., calcium carbonate, lithium acetate, etc. Solutions and dispersions of the elements or compounds are conveniently employed because they readily permit uniform blending with the powder compositions. Of course, the carrier liquid must be volatile and also inert with respect to the components of the composition.

Preferably, an aqueous alkaline solution of an alkali or an alkaline earth metal oxide or hydroxide, e.g., sodium hydroxide, lithium hydroxide, barium hydroxide, or calcium hydroxide, or a compound convertible thereto by heat such as a carbonate or bicarbonate, is employed. Although in certain cases potassium compounds can be used, these ordinarily are not as effective as compounds of sodium or lithium. Sodium compounds are particularly effective. When sodium hydroxide is employed, an oxidation resistant layer of $Na_2MoO_4$ (sodium molybdate) forms on the surface of the object during sintering. When other of the above metal compounds are employed, the corresponding molybdate forms in a similar manner providing an oxidation resistant coating.

The concentration of the alkaline compound in the aqueous solution will usually be in the range of 1–5% by weight although higher concentrations up to the solubility limit of the compound can be employed if desired. The concentration chosen depends upon the quantity of alkali or alkaline earth metal desired in the powder after drying. This latter proportion is usually in the range of 0.20–5.0% by weight of the powder compositions, irrespective of the form in which the alkali metal or alkaline earth metal is introduced. However, proportions up to 10% (by weight) can be employed. Objects and compositions prepared from powders treated with an alkaline compound contain up to 10%, generally 0.20–5.0% of alkali or alkaline earth metal.

The use of an alkaline compound or metal as described above results in the formation of converted objects having high impact strength. Usually such objects also are more dense than those prepared without such additives; however, transverse rupture strength is often lower.

The invention is illustrated in greater detail by the examples which follow. In these examples, quantities are referred to in parts by weight, and raw materials of commercial purity are employed.

EXAMPLE I

Molybdenum powder (100 g.), silico-titanium powder (186 g.), titanium powder (14 g.), niobium powder (49 g.), and benzene (250 ml.) were charged to a 1-quart porcelain ball mill together with 700–800 g. of quartz pebbles and milled for 72 hours. The benzene was allowed to evaporate, and the powder was separated from the pebbles by sieving. This powder contained molybdenum, niobium, silicon, and titanium in the proportions (by weight), 28.6% Mo, 14.2% Nb, 28.6% Si, and 28.6% Ti.

A portion of this powder (100 g.) was mixed with 30 g. of 5% aqueous sodium hydroxide and the mixture spread on an evaporating dish and allowed to air-dry overnight. The resultant cake was further dried in a vacuum oven at 115° C. for one hour. It was then ground in a porcelain mortar and put through a 200-mesh screen to remove particles larger than 75 microns in size. The sodium hydroxide-treated powder was hot-pressed at 1600° C. under 3000 p.s.i. for 10 minutes to form a hard metal bar. This bar exhibited a bulk density of 5.34 g./cc. and a transverse rupture strength measured at 25° C., 1250° C., and 1350° C. of 32,930, 31,000, and 16,470 p.s.i., respectively. Impact strength was 22.5 ft. lb./sq. in., and Knoop hardness numbers measured at 10 g., 100 g., and 1000 g. load were 1995, 1432, and 960, respectively.

Transverse rupture strength was measured using a specimen nominally ¼″ x ¼″ x 2″ supported symmetrically on parallel ceramic rods ⅛″ in diameter and 1″ apart. Force was applied at the center of the portion of the bar between the supports by the edge (radius, ¹⁄₁₆″) of a V-shaped member.

Impact strength was measured by a modification of ASTM Method E2347T, using unnotched specimens 1″ x ¼″ x ¼″ in nominal dimensions. These specimens were usually prepared from pieces resulting from previous transverse rupture tests. In impact testing, half the length of the vertically mounted specimen was unsupported, and the line of impact was 0.3″ above the support. A 25 inch-pound hammer was usually employed.

EXAMPLE II

A composition containing Mo-Nb-Si-Ti in the proportions 24.8–24.0–27.6–23.6 was prepared by dry-milling a mixture of molybdenum, niobium and titanium disilicide. The powder composition was formed into a bar by pressing at 26,000 p.s.i. at room temperature and fired in air at 1200° C. During firing the bar reached a temperature of 1200° C. in 18 seconds and a maximum temperature above 1200° C. in 23 seconds. The fired bar was bright, hard and porous. It had a Knoop hardness number 1176, measured under 100 g. load.

EXAMPLE III

A composition containing 16.4% Mo, 15.9% Nb, 36.5% Si, and 31.2% Ti was prepared from a mixture of molybdenum, niobium, and titanium disilicide by dry-milling in a porcelain ball mill. The composition was hot-pressed as described in Example I to yield hard, metallic bars having a bulk density of 5.05 g./cc. and transverse rupture strength at 25° C. and 1250° C. of 49,315 and 43,100 p.s.i., respectively. Knoop hardness numbers were 1793, 1068, and 998 at loads of 10 g., 100 g., and 1000 g., respectively.

EXAMPLES IV–IX

These examples illustrate the preparation of compositions of this invention containing various proportions of molybdenum, niobium, silicon, and titanium. In these examples, the precursor compositions were prepared according to procedure of Example I with the exception that in Examples VII and VIII milling was carried out without liquid. Where the composition was moistened with aqueous sodium hydroxide before conversion to alloy, a quantity of sodium hydroxide equal to 1% of the powder weight was employed. The compositions were converted by hot-pressing as described in Example I. Details of the compositions employed are shown in Table I, and physical properties of the converted objects prepared therefrom in Table II.

*Table I*

PREPARATION AND DENSITY OF Mo-Nb-Si-Ti BARS

| Example No. | Method [1] | Raw materials (weight ratio) | Weight ratio Mo-Nb-Si-Ti | Bulk density (g./cc.) |
|---|---|---|---|---|
| IV | (a) | Mo, Nb, TiSi₂ (19.2/18.6/69.1) | 18.0–17.4–34.9–29.8 | 4.97 |
| V | (a) | Mo, Nb, Si, TiSi₂ (15.0/0.7/2.0/13.0) | 49.0–2.0–29.4–19.6 | 5.37 |
| VI | (a) | Mo, Nb, Ti, TiSi₂ (15.0/3.0/0.9/11.1) | 50.0–10.0–20.0–20.0 | 6.13 |
| VII | (b) | Mo, Nb, TiSi₂ | 27.4–13.3–32.0–27.3 | 5.26 |
| VIII | (a) | Mo, Nb, TiSi₂ | 20.6–19.9–32.1–27.4 | 5.37 |
| IX | (b) | Mo, Nb, Ti, TiSi₂ (3.0/3.0/12.9/11.1) | 10–10–20–60 | 5.00 |

[1] The method employing NaOH was used in examples marked (b), but not in those marked (a).

Table II
PROPERTIES OF Mo–Nb–Si–Ti BARS

| Example No. | Transverse, 25° C. | Rupture, 1,250° C. | Strength (p.s.i.) 1,350° C. | Strength (p.s.i.) 1,500° C. | Impact strength (ft. lb./sq. in.) |
|---|---|---|---|---|---|
| IV [1] | 44,430 | 32,780 | | | 23.1 |
| V | 29,990 | 36,730 | 20,040 | | |
| VI | 28,515 | 41,255 | 36,980 | 20,930 | 15.2 |
| VII [2] | | | | 2,690 | 10.5 |
| VIII | | | | 28,230 | [3] 6.5 |
| IX | 14,100 | 8,445 | 22,670 | [4] 17,395 | 5.5 |

[1] Knoop hardness numbers were 1500, 1230, and 926 at loads of 10 g., 100 g., and 1000 g. respectively.
[2] This product was employed as a cutting tool and readily cut a wrought super alloy containing (by weight) Ni 73%, Cr 15%, Fe 7.0%, Ti 2.5%, and minor amounts of Al, Nb, Mn, Si, and C.
[3] On a specimen prepared by Method (b) of Table I.
[4] At 1450° C.

The converted compositions and objects of this invention are very resistant to high temperature oxidation as indicated by the small changes in weight and linear dimension which occur during exposure thereof to elevated temperatures in air. The oxidation resistance of the products of this invention was determined by exposing the metal to air in an electric muffle furnace at the successively higher temperatures of 900, 1000, 1100, 1200, 1300, 1400, and 1500° C. for 16 hours at each temperature. After each heating period, the sample was cooled to room temperature, weighed, and measured before exposure to the next heating cycle. The cumulative changes in weight and in dimension for the products of the above and several additional examples at a number of representative temperatures are recorded in Table III.

Table III
OXIDATION RESISTANCE OF Mo–Nb–Si–Ti BARS

| Example No. | 1100° C. $\Delta W$ | 1100° C. $\Delta D$ | 1300° C. $\Delta W$ | 1300° C. $\Delta D$ | 1400° C. $\Delta W$ | 1400° C. $\Delta D$ | 1500° C. $\Delta W$ | 1500° C. $\Delta D$ |
|---|---|---|---|---|---|---|---|---|
| I | 0.4 | 3.7 | −0.1 | 5.0 | −0.1 | 5.3 | −4.9 | 5.5 |
| III | 0.2 | 0.5 | 0.3 | 0.9 | 0.5 | 1.0 | 1.0 | 1.7 |
| IV | 0.2 | 0.9 | 0.1 | 1.0 | 0.3 | 1.4 | 0.1 | 2.9 |
| V | −0.6 | 1.8 | −0.6 | 1.7 | −0.8 | 1.9 | −0.7 | 2.3 |
| VI | −1.5 | 2.6 | −1.9 | 2.5 | −3.0 | 4.4 | −7.7 | 2.9 |
| VII | 0.1 | 1.8 | 0.1 | 1.7 | 0.3 | 1.9 | 1.0 | 3.9 |
| VIII | 0.2 | 0.9 | 0.4 | 1.3 | 0.5 | 1.6 | 0.8 | 2.5 |
| IX | 1.3 | 2.1 | 3.4 | 5.8 | 5.4 | 4.5 | | |
| X | 0.4 | 0.7 | 0.5 | 1.0 | 0.7 | 1.2 | 1.1 | 3.0 |
| XI | 0.4 | 1.7 | −1.8 | 3.1 | −2.8 | 2.7 | | |
| XII | 0.3 | 0.7 | 0.4 | 1.0 | 0.5 | 1.2 | 0.8 | 3.2 |
| XIII | 0.3 | 0.8 | 0.4 | 0.9 | 0.6 | 1.3 | 0.3 | 3.8 |
| XIV | 0.04 | | 0.2 | | [1] 0.4 | | | |
| XV | 0.5 | | 0.8 | | 1.4 | | 2.3 | |

[1] At 1360° C.

In Examples X–XV, Mo, Nb, and TiSi$_2$ were milled dry to produce the precursor powder compositions. In Examples XII and XIII, these powders were moistened with aqueous NaOH (1% of powder weight) before conversion to alloy. In Examples X, XI, XIV and XV, no sodium hydroxide was employed. Converted objects were obtained by hot-pressing as in Example I. In Example XV, the powder was converted to a metallic bar by pressing at 26,000 p.s.i. at room temperature and firing at 1300° C. Compositions and bulk densities were:

| Example No. | Mo–Nb–Si–Ti | Bulk density, (g./cc.) |
|---|---|---|
| X | 12.9–12.5–40.2–34.4 | 4.83 |
| XI | 13.8–26.6–32.1–27.5 | 5.26 |
| XII | 8.6–16.7–40.3–34.3 | 4.68 |
| XIII | 17.2– 8.3–40.2–34.3 | 4.68 |
| XIV | 19.8–19.1–33.0–28.1 | 4.31 |
| XV | 16.4–15.9–36.5–31.2 | |

EXAMPLES XVI–XXI

These examples illustrate the preparation of compositions of this invention by melting and casting in a conventional manner. In each example, commercial molybdenum, niobium, silicon and titanium powders of 200-mesh size and better than 99% purity were combined to form the desired composition. The precursor compositions thus prepared were pressed into a ½" d. steel die by applying a pressure of 10,000–20,000 p.s.i. at room temperature to fabricate pellets 0.75–1" long. The pellets were individually arc melted in a water cooled, copper crucible in an atmosphere of argon. The copper crucible was the negative electrode and the positive electrode was tungsten. Direct current was employed and the voltage was 20–40 v. and the amperage was 100–200 amps. Upon cooling to room temperature, the melts formed metallic buttons which were annealed at 1400° C. for sixty hours under argon, thereby yielding hard, strong and oxidation resistant converted compositions. Compositions (percent by weight), hardness (KHN$_{100}$, i.e., Knoop Hardness Number measured at 100 g. load), and density (as calculated from X-ray data) of the melt-cast compositions were as follows:

| Example No. | Mo–Nb–Si–Ti | (KHN$_{100}$), kg./mm$^2$ | X-ray density, g./cc. |
|---|---|---|---|
| XVI | 27.5–27.5–18.1–26.7 | | 6.47 |
| XVII | 34.2–24.0–18.5–22.8 | 1,030 | 6.54 |
| XVIII | 62.5–9.2–15.8–10.2 | | |
| XIX | 8.5–38.1–20.1–33.3 | 1,313 | 5.99 |
| XX | 18.3–17.6–42.6–21.4 | 1,050 | 5.36 |
| XXI | 21.5–24.2–41.8–12.5 | 895 | 5.36 |

Although the precursor compositions and converted compositions and objects of this invention are composed principally of molybdenum, niobium, silicon, and titanium, there can be present other element(s) or compound(s) that do not have a materially adverse effect upon the basic and novel characteristics of the converted compositions. Preferably molybdenum, niobium, silicon and titanium constitute at least 90% of the untreated compositions and converted products. Compositions containing at least 95% of these elements are particularly preferred because of the superior quality of the converted compositions and shaped objects obtained therefrom. Inconsequential amounts of impurities such as iron, aluminum, copper, manganese, carbon, and chromium are usually found in minor amounts in the starting materials employed. It is generally preferred that the compositions contain as little as possible of such impurities. Metal oxides from erosion of porcelain ball mills used in the preparation of powder compositions are sometimes present, although such oxides will be excluded from the converted compositions for particular applications. Of course, as described above, the compositions will often contain such desirable additives as alkali or alkaline earth metals or compounds thereof.

Elemental molybdenum and silicon are not present in the converted objects of this invention to any appreciable extent, i.e., to an extent sufficient to materially affect their nature as refractory structural materials, in spite of the fact that these elements may constitute a considerable part of the composition before firing, hot-pressing, or melt-casting. The absence of these materials in elemental form is highly desirable since molybdenum, niobium, and titanium are not resistant to high temperature oxidation and elemental silicon is brittle.

When compositions containing molybdenum, niobium, silicon, and titanium in proportions outside the ranges stated above are employed, the converted objects prepared therefrom are deficient in one or more respects. For example, the presence of more than 65% molybdenum leads to the formation of compositions having poor oxidation resistance at high temperature due to loss of MoO$_3$, while proportions of molybdenum below 8% are also detrimental because of reduced oxidation resistance (weight gain) and poor dimensional stability at elevated temperatures. Objects prepared from compositions containing more than 30% niobium exhibit excessive growth in air at high temperatures as well as weight loss. The use of less than 2% niobium leads to difficulties in fabricating crack-free objects, and to loss of the beneficial effects of niobium, such as acceleration of the conversion reaction and its attainment at lower temperatures. When less than 15% of silicon is present, the converted objects exhibit poor oxidation resistance and the presence of more than 45% silicon leads to converted products that are extremely brittle. Those containing less than 10% titanium have poor strength at 1400–1500° C. while converted compositions and objects containing more than 65% titanium exhibit poor scale resistance. The deficiencies of such converted compositions are illustrated in the following examples.

EXAMPLES A–C

These examples were carried out by the procedure of Example I employing molybdenum, niobium and titanium disilicide as starting materials. The proportions by weight of molybdenum, niobium, silicon, and titanium in the precursor compositions and the bulk density of the products are shown in Table IV. The poor oxidation resistance is indicated by the data in Table V which summarizes the cumulative effects of heating in air at 500° C. and 750° C. for 16 hours at each temperature.

*Table IV*

| Example No.[1] | Mo–Nb–Si–Ti | Bulk density (g./cc.) |
|---|---|---|
| A (a) | 37.1–36.0–14.5–12.4 | 6.10 |
| (b) | 37.1–36.0–14.5–12.4 | 6.10 |
| B (a) | 24.9–48.2–14.5–12.4 | 5.99 |
| (b) | 24.9–48.2–14.5–12.4 | 5.95 |
| C (a) | 19.6–37.9–22.9–19.6 | 5.82 |
| (b) | 19.6–37.9–22.9–19.6 | 5.76 |

[1] The sodium hydroxide treatment described in Example I was employed in part (b) of these examples; in part (a) sodium hydroxide treatment was omitted.

*Table V*

| Example No. | Cumulative Change (percent) in Weight ($\Delta W$) and Linear Dimension ($\Delta D$) | | | |
|---|---|---|---|---|
| | 500° C. | | 750° C. | |
| | $\Delta W$ | $\Delta D$ | $\Delta W$ | $\Delta D$ |
| A (a) | Powdered | | | |
| (b) | 0.03 | | 0.12 | Completely oxidized. |
| B (a) | Powdered | | | |
| (b) | −0.73 | | 0.42 | Oxidized and cracked. |
| C (a) | −1.63 | | 1.74 | Powdered. |
| (b) | 0.02 | | 0.11 | Completely oxidized. |

Some oxidation of the converted compositions and objects of this invention, particularly those which are porous, may occur on prolonged heating at high temperature. However, this oxidation is not extensive, as shown by the small weight gains upon heating in air, and does not materially weaken the structure. In such products, complex oxides of molybdenum, niobium, silicon, and titanium may be present in minor amounts, i.e., up to 10%, although the percentage will generally be considerably less. For ease of understanding and simplicity, the compositions listed are those of the initial components before prolonged heating in air.

Preferably the powders employed in preparing the compositions of this invention are obtained by milling or dry-grinding by conventional methods until the desired particle size is achieved. The progress of particle size reduction can be followed by usual techniques, for example, by microscopic observation. Although such powders may contain up to 5%, by weight, of particles coarser than 75 microns, and alloys satisfactory for some purposes can be prepared therefrom, it is preferred that less than 2% of such coarse particles be present. It is still better to screen out all coarse particles since they serve as points of chemical and mechanical inhomogeneity. Commercial powdered forms of molybdenum, titanium, molybdenum silicide, and titanium disilicide which are available with primary particle sizes less than 5 microns, and silico-titanium which is usually much coarser (8–200 mesh) are suitable for use in preparing the compositions of this invention.

It is preferred that the final converted shaped objects be at least 1 mm. in minimum dimension since thin objects are not only difficult to obtain but if obtainable have low structural strength, and when shaped prior to firing, are more subject to oxidation during firing than thicker objects. Of course, as indicated above, it is sometimes desirable to convert the powder composition, grind the converted composition and produce the final object by refiring the ground converted powder. When this is done, it may be desirable for ease in grinding that the thickness of the intermediate converted object, e.g., a wafer, be less than 1 mm.

In the examples, conversion of the precursor compositions by hot-pressing and by melting and casting has been described. Satisfactory conversion can also be effected by sintering after cold-pressing the composition into the desired form. To obtain optimum properties in the final alloy, it is preferred that heating, if in air, be rapid. However, if water or another volatile liquid has been employed in preparing the powder for firing, the initial rate of heating, i.e., up to about 350° C., must be slow to permit drying without cracking. After a temperature of about 350° C. is reached, heating to the conversion temperature should be as rapid as possible since slow heating in this range brings about powdering, expansion, and cracking of the product.

The ease of fabrication of the compositions of this invention into hard, impact-resistant, and oxidation resistant shaped objects makes them useful in the preparation of tools for cutting and sharpening operations. The converted compositions can also be crushed to the form of grit and used in the preparation of bonded abrasive wheels and brased grit surfaces on metal sheets. By virtue of their electrical resistance, which is in the range of conventional resistance wires and graphite, the products are useful in the preparation of electric heating elements. The products of this invention can also be used as structural components for high-temperature furnaces and heat engines. In these uses, the ease of fabrication of shaped objects is again a particular advantage favoring the use of the subject compositions. The compositions of this invention are also useful as reinforcing agents for ductile metals and alloys.

A particularly important characteristic of the converted compositions of this invention is their inherent lubricity at elevated temperatures. This property, coupled with excellent high temperature properties, renders the converted products outstanding as materials of construction for extrusion die nibs. Such die nibs can be prepared by melting and casting a precursor composition in the manner described in Examples XVI–XXI or by firing as in Example I. High inherent lubricity appears to be augmented by the presence of oxides introduced as hereinbefore described. Use of an alkali metal compound during shaping of the precursor composition also appears to improve lubricity.

Because of their high oxidation resistance, the converted objects of this invention are susceptible to strength improvement by further mechanical treatments in air without protective coatings. Such treatments include grinding converted objects of high hardness and the production of wrought products by forging, swaging, and hammering. Thus, an ingot cast as described in Examples XVI–XXI can be forged in air to produce machine parts of high impact strength.

Although most of the foregoing discussion of the compositions and their utility has been centered around the excellent high temperature characteristics of the fired and melt-cast compositions and articles, it is to be understood that the utility of these products is not limited to high temperature applications. They may also be used at room temperature or any other temperature below 1000° C. However, the primary contribution of the products of the invention to the structural material arts resides in their heretofore unattainable combination of high temperature properties.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A composition of matter in which molybdenum, niobium, silicon and titanium are present in the proportions, by weight, of 8–65% molybdenum, 2–30% niobium, 15–45% silicon, and 10–65% titanium.

2. A composition of claim 1 wherein the molybdenum, niobium, silicon and titanium are present in the proportions, by weight, of 15–50% molybdenum, 2–25% niobium, 20–40% silicon, and 15–40% titanium.

3. A composition of claim 1 wherein the molybdenum, niobium, silicon and titanium are homogeneously admixed in the form of powder having substantially all particles less than 75 microns in size.

4. A composition of claim 1 containing 0.2–10%, by weight, of at least one member selected from the group consisting of an alkali metal and an alkaline earth metal.

5. A composition of claim 1 consisting essentially of at least one phase of a formula selected from the group consisting of $(Nb_xTi_yMo_{1-x-y})Si_2$ and $$(Nb_{x'}Ti_{y'}Mo_{1-x'-y'})_5Si_3$$

each of $x$, $x'$, $y$, $y'$, $1-x-y$ and $1-x'-y'$ being between 0 and 1.

6. An article of manufacture having excellent impact strength, good oxidation and creep resistance, high hardness and good transverse rupture strength at elevated temperatures and consisting essentially of molybdenum, niobium, silicon and titanium in the proportions, by weight, of 8–65% molybdenum, 2–30% niobium, 15–45% silicon and 10–65% titanium.

7. A composition of matter in which molybdenum, niobium, silicon, titanium and sodium hydroxide are present in the proportions, by weight, of 8–65% molybdenum, 2–30% niobium, 15–45% silicon, 10–65% titanium, and 0.2–10% sodium hydroxide.

References Cited by the Examiner
UNITED STATES PATENTS

| | | | |
|---|---|---|---|
| 1,996,220 | 4/35 | Tigerschiöld | 15—201 |
| 2,852,366 | 9/58 | Jenlsins | 29—182.5 |
| 2,982,619 | 5/61 | Long | 29—182.5 |
| 3,051,924 | 8/62 | Ambeng et al. | 29—182.5 |

OTHER REFERENCES

Schwarzkopf and Kiefer: Refractory Hard Metals, the MacMillan Co., New York, 1953, p. 349.

CARL D. QUARFORTH, *Primary Examiner.*

OSCAR R. VERTIZ, *Examiner.*